Aug. 18, 1959 W. P. BOOTHROYD 2,900,563

CATHODE RAY TUBE DEVICES HAVING SIGNAL-GENERATING MEANS

Filed July 3, 1956

INVENTOR.
WILSON P. BOOTHROYD
BY
[signature]
ATTORNEY

United States Patent Office 2,900,563

Patented Aug. 18, 1959

2,900,563

CATHODE RAY TUBE DEVICES HAVING SIGNAL-GENERATING MEANS

Wilson P. Boothroyd, Huntingdon Valley, Pa., assignor to Philco Corporation, Philadelphia, Pa., a corporation of Pennsylvania Application July 3, 1956, Serial No. 595,751

10 Claims. (Cl. 315—21)

This invention relates to cathode ray tube devices having means responsive to electron beam impingement for generating a signal indicative of the rate of the beam's traversal of the target area.

While the invention is applicable generally to such cathode ray tube devices, it is intended particularly for use in color television receivers employing a single cathode ray tube, wherein the proper color rendition is insured by means of a control signal generated by electron beam impingement on elements within the picture tube. In one form of such a color television receiver, the screen of the picture tube may have vertical phosphor stripes thereon arranged in successive triplets, the stripes of each triplet being successively emissive of light of different colors during each horizontal line scan of the screen. The control signal-generating elements may be in the form of vertical indexing lines or stripes associated with the color triplets. In practice, there may be one index stripe for each color triplet. A screen of this general character is disclosed and claimed in a copending application of C. Bocciarelli Serial No. 198,709 filed December 1, 1950.

In operation of a cathode ray tube such as mentioned above, employing signal-generating elements, the frequency of the generated signal is determined by the spacing of the signal-generating elements and by the velocity of the electron beam which activates said elements. It is desirable that the timing of the beam impingement on said elements be as nearly uniform as possible so as to reduce to a minimum frequency variation of the generated signal. The principal reason for this is to enable the use of narrow band circuits in the control system. In the past, the signal-generating elements have been arranged with uniform spacing, and this has necessitated precise linear line scanning, i.e., constant velocity of the scanning electron beam, in order to minimize frequency variation of the generated signal.

Experimentation in connection with horizontal scanning circuits has shown that greater efficiency and uniformity are obtained when non-linear scanning is permitted. The horizontal scanning wave shape normally produced by such circuits is of such character that each line scan is relatively fast during the first part of the scan and is relatively slow during the latter part of the scan, the wave shape being generally of parabolic sawtooth form. Not only are greater efficiency and uniformity obtained by permitting such normal non-linear horizontal scanning, but this avoids the substantial expense involved in modification of the scanning to achieve precise linearity. However, with uniformly spaced signal-generating elements, the non-linear scanning causes undesirable variation of the frequency of the generated signal.

One object of the present invention is to overcome this problem and to achieve as nearly as possible uniformity of timing of beam impingement on the signal-generating elements without resort to linearization of the horizontal line scan.

Another object of the invention is to achieve the advantages of normal non-linear horizontal scan with respect to optimization for greater efficiency and uniformity, and to overcome the disadvantage of the normal non-linearity.

A further object of the invention is to achieve the desired results in a simple manner and at low cost.

In accordance with this invention, a cathode ray tube system is provided wherein the horizontal scanning circuit is unmodified so far as its sweep characteristic is concerned, and means are provided for generating in response to the line scanning action a control signal having minimum frequency variation despite the nonlinearity of each line scan. More particularly, according to this invention, signal-generating elements are disposed for electron beam impingement thereon during each line scan, and said elements are positionally arranged according to the non-uniformity of velocity of the beam's line-scanning motion so as to effect more uniform timing of beam impingement on said elements. In the preferred embodiment of the invention, the signal-generating elements are in the form of vertical lines or stripes whose horizontal spacing varies according to the non-uniformity of velocity of the beam's line-scanning motion so as to effect more uniform timing of beam impingement on said elements.

The invention may be fully understood from the following detailed description in connection with the accompanying drawing wherein Fig. 1 is a simplified diagrammatic illustration of a color television receiver embodying the preferred form of the present invention;

Figure 1:
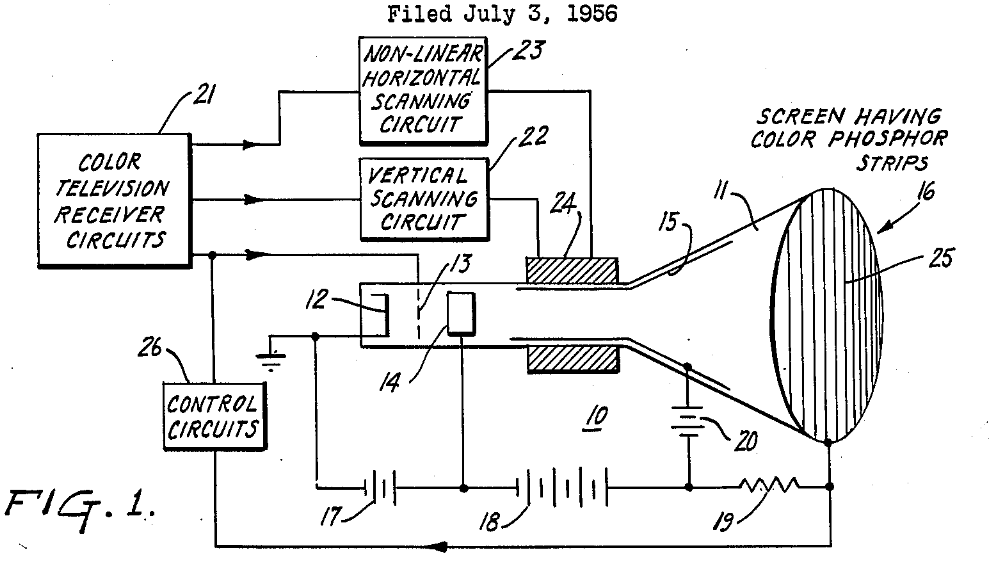

Referring first to Fig. 1, there is shown a color television receiver of the type employing a single cathode ray tube display device wherein a single writing electron beam is utilized to produce the color image on the screen of the cathode ray tube. The cathode ray tube 10 may comprise an evacuated envelope 11, a cathode 12, a control electrode 13, a focusing anode 14 and an accelerating anode 15, the latter of which may consist of a conductive coating on the inner wall of the envelope terminating at a point spaced from the screen 16 of the tube as in usual practice. Anode 14 is maintained positive with respect to cathode 12 by potential source 17. Screen 16 is maintained positive with respect to anode 14 by potential source 18 which is connected to the screen through resistor 19. Anode 15 is preferably maintained positive with respect to screen 16 by potential source 20.

Block 21 represents the color television receiver circuits which supply to the control electrode 13 a color television signal having successively occurring components representative respectively of different chromatic aspects of elemental areas of an image to be reproduced. The vertical and horizontal scanning circuits are represented by blocks 22 and 23, these circuits serving to supply deflection currents to the deflection yoke 24.

The cathode ray tube 10 is of the type which employs signal-generating elements, as hereinbefore mentioned, such elements preferably being in the form of vertical lines or stripes on or adjacent to the screen, as represented at 25. Preferably the screen 16 has vertical phosphor stripes (not shown) thereon arranged in successive triplets, as previously mentioned, and the indexing stripes 25 are preferably formed of material having different secondary electron emissivity than the adjacent portions of the screen. Examples of suitable screen structures are described in the aforementioned Bocciarelli application.

For simplicity, it may be assumed that the desired control signal is generated by impingement of the writing beam on the indexing elements 25 as the beam scans the screen in successive horizontal lines transversely of said elements. However it is possible to use a separate indexing beam for generation of the desired control signal, as well known in the art.

In a system of the character represented in Fig. 1, an indexing or control signal is produced across the resistor 19, the frequency of which signal is proportional to the rate of scanning of successive elemental areas of the screen during each line scan. The derived control signal is utilized to insure proper color rendition. Proper color rendition requires that the impingement of the writing beam on the color phosphor stripes and the modulation of the beam by the color components of the color television signal be exactly coordinated. The control signal generated by the indexing stripes 25 may be utilized to effect this exact coordination either by control of the beam modulation, as described in the copending application of M. E. Partin Patent No. 2,759,042 Serial No. 382,384, filed September 25, 1953, or by control of the horizontal scanning, as described in the copending application of W. P. Boothroyd Serial No. 219,093, filed April 3, 1951. Assuming control of the beam modulation by the derived control signal, in Fig. 1 the block 26 represents the control circuits to which the control signal is supplied.

As previously mentioned, in prior systems of this general type, the signal-generating elements associated with the screen of the cathode ray tube have been equally spaced, and this has necessitated linearization of the horizontal line scan in order to minimize frequency variation of the generated control signal. The linearization of the horizontal scanning circuit is disadvantageous for the reasons previously pointed out.

In accordance with the present invention, the horizontal scanning circuit 23 is unmodified, insofar as linearization is concerned, so that the horizontal scan is permitted to be non-linear, and the signal-generating elements 25 are positionally arranged according to the non-linearity of the horizontal scan so as to effect more uniform timing of beam impingement on said elements.

Figure 2:
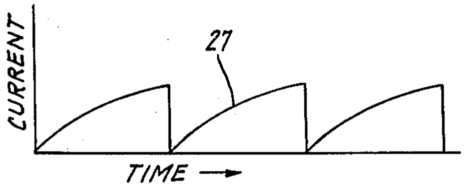
Fig. 2 shows generally the characteristic current waveform produced in the horizontal deflection coils by a conventional horizontal scanning circuit which is unmodified with respect to linearization of each line scan.

Fig. 2 shows generally the characteristic current waveform 27 produced in the horizontal deflection coils by a conventional horizontal scanning circuit. In the case of electrostatic deflection, of course, the same general waveform would represent deflection voltage. The waveform is generally of parabolic sawtooth form, its slope decreasing progressively during each cycle. Thus during each line scan, the electron beam velocity is initially relatively high and decreases as the line scan progresses.

Figure 3:
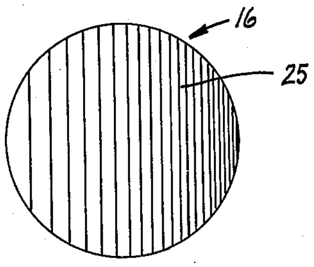
Fig. 3 is a face view of a screen of a cathode ray tube constructed according to the preferred form of the present invention.

Fig. 3 shows the arrangement of the indexing elements 25, according to this invention, in corresponding relation to the non-uniformity of velocity of the beam's line-scanning motion so as to effect more uniform timing of beam impingement on said elements. Thus, as shown in Fig. 3, the signal-generating elements 25 have a certain spacing at the left side of the screen area, and have progressively decreasing spacing from left to right according to the decreasing slope of the waveform shown in Fig. 2. Thus the spacing of the elements 25 is caused to correspond substantially to the non-linear scanning waveform shown in Fig. 2. This arrangement of the elements 25 effects more uniform timing of beam impingement on said elements, and minimizes frequency variation of the generated signal. During the first part of each line scan, the beam velocity is relatively high and the elements 25 have relatively wide spacing, and as the scan progresses, the beam velocity decreases and the elements 25 have decreasing spacing to compensate for the decreasing velocity of the beam.

From the foregoing description, it will be understood that in any case the signal-generating or indexing elements are arranged in a pattern which is determined by the horizontal scanning characteristic. In other words, for a given horizontal scanning characteristic of the horizontal scanning circuit employed, the signal-generating elements are arranged so that their spacing is directly related to the velocity of the beam.

It will be apparent that with non-uniform spacing of the signal-generating elements according to this invention, the width of the color phosphor triplets will also be non-uniform. However, because of the non-linearity of each horizontal line scan, the non-uniformity of width of the color phosphor triplets does not adversely affect the production of the color image.

In practice, it is desirable to provide the signal-generating elements on the screen as integral portions thereof, and the manufacture of the screen structure may be carried out, for example, according to the method described in the copending application of M. Sadowsky and S. L. Parsons, Serial No. 408,219, filed February 4, 1954. In that method, the respective sets of different color phosphor stripes and the signal-generating stripes are provided on the faceplate of the cathode ray tube by first applying a coating of photosensitive material, then exposing selected portions of said coating to light, then applying the material which is to form the stripes, and finally washing way the unexposed portions of the photosensitive material and the material deposited thereon. In such method, the stripe pattern for selective exposure of the photosensitive material may be produced by projecting light through a mask having equally spaced translucent stripes but being otherwise opaque.

In the formation of a screen embodying the present invention, the same general method may be employed but of course the non-uniform spacing of the stripes must be provided. To establish the non-uniformity of spacing in relation to the parabolic sawtooth waveform of Fig. 2, light may be passed from a point light source through a mask or filter onto a curved light diffusing plate in such a manner as to produce the desired stripe pattern, and the pattern on the curved plate may be projected to a photosensitive plate to be used as the mask for projection of the pattern onto the screen of the cathode ray tube.

Figure 4:
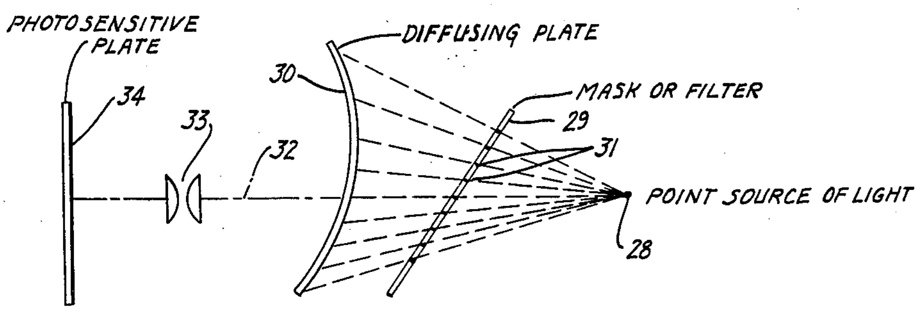
Fig. 4 is an explanatory illustration to facilitate description of one method which may be employed in the manufacture of the screen.

This may be better understood with the aid of Fig. 4 which is a plan view. Light from a point source 28 is passed through a tilted mask or filter 29 onto a curved diffusing plate 30, the mask 29 having equally-spaced vertical translucent stripes 31 and being otherwise opaque. The stripes produced on the plate 30 are of progressively varying spacing according to the horizontal angularity of mask 29 with respect to the axis 32 and according to the curvature of plate 30 which simulates the non-linear characteristic of the waveform of Fig. 2. Thus the angularity of mask 29 and the curvature of plate 30 are so chosen as to produce a desired light pattern on plate 30 according to the non-linear horizontal scan represented in Fig. 2. This pattern is projected by an optical system 33 onto a photosensitive plate 34. The latter may then be used as a mask for projection of the pattern onto the screen of the cathode ray tube according to the method described in the aforementioned Sadowsky et al. application.

It will be understood, of course, that this invention contemplates that the screen may be formed in any suitable manner and is not limited to the method referred to above.

From the foregoing description, it will be seen that this invention provides an arrangement by which the advantages of non-linear line scanning are obtained, and the disadvantages of such scanning are effectively eliminated. Moreover any increase in cost due to the special character of the screen arrangement provided by this invention is fully compensated by the economy of using a horizontal scanning circuit which is unmodified in respect to linearization.

While the invention has been described with reference to a particular embodiment and its application to a color television receiver, it is to be understood that the invention is not thus limited but contemplates such other embodiments and specific applications as may become apparent to those skilled in the art.

I claim:

1. In a color television receiver, a cathode ray image-producing tube having an electron beam intensity control electrode and having a screen to be scanned in lines by the electron beam whose intensity is controlled by said electrode, said screen having elemental areas each successively emissive of light of different colors during each line scan of the screen by said electron beam, means for supplying to said electrode a color television signal having successively occurring components representative respectively of different chromatic aspects of elemental areas of an image to be reproduced, means for effecting line-by-line scanning motion of said electron beam, which motion is inherently of non-uniform velocity during each line scan, means responsive to the beam traversal of said screen for producing an alternating control signal having minimum frequency variation despite the non-uniformity of the scanning motion of the beam, said last means including elements on said screen positionally arranged according to the non-uniformity of velocity of the beam's line-scanning motion so as to effect more uniform timing of beam impingement on said elements, and means for utilizing said control signal to insure coincidence between the modulation of said electron beam by each color-representative component of said color television signal and the beam impingement upon the desired portion of said screen.

2. A color television receiver according to claim 1, wherein the scanning motion of said electron beam is relatively rapid at the beginning of each line scan and decreases in velocity as the scan progresses, and said elements have a certain spacing at the beginning of each line of the screen and have progressively decreasing spacing throughout each line.

3. In a color television receiver, a cathode ray image-producing tube having an electron beam intensity control electrode and having a screen to be scanned in horizontal lines by the electron beam whose intensity is controlled by said electrode, said screen having vertical phosphor stripes thereon arranged in successive triplets, the stripes of each triplet being successively emissive of light of different colors during each line scan of the screen by said electron beam, means for supplying to said electrode a color television signal having successively occurring components representative respectively of different chromatic aspects of elemental areas of an image to be reproduced, means for effecting line-by-line scanning motion of said electron beam, which motion is inherently of non-uniform velocity during each line scan, means responsive to the beam traversal of said screen for producing an alternating control signal having minimum frequency variation despite the non-uniformity of the scanning motion of the beam, said last means including vertical stripe elements on said screen spaced horizontally according to the non-uniformity of velocity of the beam's line-scanning motion so as to effect more uniform timing of beam impingement on said elements, and means for utilizing said control signal to insure coincidence between the modulation of said electron beam by each color-representative component of said color televison signal and the beam impingement upon the desired portion of the screen.

4. A color televison receiver according to claim 3, wherein said stripe elements are formed of material having different secondary electron emissivity than the adjacent portions of said screen.

5. A color television receiver according to claim 3, wherein the scanning motion of said electron beam is relatively rapid at the beginning of each line scan and decreases in velocity as the scan progresses, and said stripe elements have a certain horizontal spacing at the side of the screen at which each line scan begins and have progressively decreasing spacing in the direction of the opposite side.

6. In a color television picture tube wherein an electron beam is caused to move horizontally in successive line scannings at non-uniform velocity, a screen having vertical phosphor stripes thereon arranged in successive triplets, the stripes of each triplet being successively emissive of light of different colors during each line scan of the screen by said electron beam, said screen also having thereon signal-generating vertical stripe elements spaced horizontally according to the non-uniformity of velocity of the beam's line-scanning motion so as to effect more uniform timing of beam impingement on said elements.

7. A color television picture tube according to claim 6 wherein the scanning motion of the electron beam is relatively rapid at the beginning of each line scan and decreases in velocity as the scan progresses, and said stripe elements have a certain horizontal spacing at the side of the screen at which each line scan begins and have progressively decreasing spacing in the direction of the opposite side.

8. In a color television receiver, a cathode ray image-producing tube having an electron beam intensity control electrode and having a screen to be scanned in parallel lines by the electron beam whose intensity is controlled by said electrode, said screen having phosphor stripes thereon extending transversely of the direction of line scanning and arranged in successive triplets, the stripes of each triplet being successively emissive of light of different colors during each line scan of the screen by said electron beam, means for supplying to said electrode a color television signal having successively occurring components representative respectively of different chromatic aspects of elemental areas of an image to be reproduced, means for effecting line-by-line scanning motion of said electron beam, which motion is inherently of non-uniform velocity during each line scan, means responsive to the beam traversal of said screen for producing an alternating control signal having minimum frequency variation despite the non-uniformity of the scanning motion of the beam, said last means including stripe elements on said screen parallel to said phosphor stripes and spaced according to the non-uniformity of velocity of the beam's line-scanning motion so as to effect more uniform timing of beam impingement on said elements, and means for utilizing said control signal to insure coincidence between the modulation of said electron beam by each color-representative component of said color television signal and the beam impingement upon the desired portion of the screen.

9. In a cathode ray tube, means for producing an electron beam, a screen arranged to be impinged by said beam, means for causing said beam to scan successive lines of said screen in a scanning motion which is relatively rapid during part of each line scan and is relatively slow during the rest of each line scan, and signal-generating elements disposed to be successively impinged by said beam during each line scan, said elements being in the form of vertical line elements having a certain horizontal spacing at the side of the screen at which each line scan begins and having progressively decreasing horizontal spacing in the direction of the opposite side according to the non-uniformity of velocity of the beam's line-scanning motion so as to effect more uniform timing of beam impingement on said elements.

10. In a color image-producing cathode ray tube wherein an electron beam is caused to move horizontally in successive line scannings at non-uniform velocity, a screen having elemental areas each successively emissive of light of different colors during each line scan of the screen by said electron beam, said screen also having thereon signal-generating elements spaced horizontally according to the non-uniformity of velocity of the beam's line-scanning motion so as to effect more uniform timing of beam impingement on said element.

References Cited in the file of this patent

UNITED STATES PATENTS

| | | |
|---|---|---|
| 2,631,259 | Nicoll | Mar. 10, 1953 |
| 2,689,314 | Gunderson | Sept. 14, 1954 |
| 2,699,520 | Lubcke | Jan. 11, 1955 |